(12) United States Patent
Overall et al.

(10) Patent No.: US 7,257,358 B2
(45) Date of Patent: Aug. 14, 2007

(54) METHOD AND APPARATUS FOR DETECTING REGISTRATION ERRORS IN AN IMAGE FORMING DEVICE

(75) Inventors: Gary Scott Overall, Lexington, KY (US); Gregory Lawrence Ream, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 667 days.

(21) Appl. No.: 10/741,707

(22) Filed: Dec. 19, 2003

(65) Prior Publication Data

US 2005/0134874 A1   Jun. 23, 2005

(51) Int. Cl.
G03G 15/01 (2006.01)
(52) U.S. Cl. ...................... 399/301; 347/116
(58) Field of Classification Search .............. 399/301; 347/116
See application file for complete search history.

(56) References Cited

U.S. PATENT DOCUMENTS

| | | |
|---|---|---|
| 4,569,584 A | 2/1986 | St. John et al. |
| 4,916,547 A | 4/1990 | Katsumata et al. |
| 4,963,899 A | 10/1990 | Resch, III |
| 5,160,946 A | 11/1992 | Hwang |
| 5,287,162 A | 2/1994 | de Jong et al. |
| 5,319,537 A | 6/1994 | Powers et al. |
| 5,339,150 A | 8/1994 | Hubble, III et al. |
| 5,373,355 A | 12/1994 | Ando et al. |
| 5,381,167 A | 1/1995 | Fujii et al. |
| 5,384,592 A | 1/1995 | Wong |
| 5,394,223 A | 2/1995 | Hart et al. |
| 5,404,202 A | 4/1995 | Abramsohn |
| 5,457,518 A | 10/1995 | Ashikaga et al. |
| 5,499,092 A | 3/1996 | Sasaki |
| 5,510,885 A | 4/1996 | Mori et al. |
| 5,523,823 A | 6/1996 | Ashikaga |
| 5,555,084 A | 9/1996 | Vetromile et al. |
| 5,579,092 A | 11/1996 | Isobe et al. |
| 5,587,771 A | 12/1996 | Mori et al. |
| 5,600,404 A | 2/1997 | Ando et al. |
| 5,729,353 A | 3/1998 | Sawayama et al. |
| 5,748,221 A | 5/1998 | Castelli et al. |
| 5,765,083 A | 6/1998 | Shinohara |
| 5,768,671 A | 6/1998 | Komiya et al. |
| 5,778,280 A | 7/1998 | Komiya et al. |
| 5,802,422 A | 9/1998 | Hokari |
| 5,825,984 A | 10/1998 | Mori et al. |
| 5,854,958 A | 12/1998 | Tanimoto et al. |
| 5,872,586 A | 2/1999 | Shio |
| 5,875,380 A | 2/1999 | Iwata et al. |
| 5,896,472 A | 4/1999 | Takayama |
| 5,909,235 A | 6/1999 | Folkins |
| 5,946,537 A | 8/1999 | Nakayasu et al. |
| 5,995,717 A | 11/1999 | Tanaka |
| 6,014,542 A | 1/2000 | Hozumi et al. |

(Continued)

Primary Examiner—David M. Gray
Assistant Examiner—Ruth N. LaBombard
(74) Attorney, Agent, or Firm—Coats & Bennett, PLLC

(57) ABSTRACT

A method of forming a registration pattern to enable detection of registration errors in an image forming device includes forming a first registration mark on a substrate at a first image forming station, and partially erasing the first registration mark formed on the substrate at a second image forming station to form the registration pattern. A method of automatically detecting the registration errors further comprises sensing the registration pattern, and detecting registration errors based on the registration pattern.

56 Claims, 13 Drawing Sheets

U.S. PATENT DOCUMENTS

| | | |
|---|---|---|
| 6,038,423 A | 3/2000 | Tagawa et al. |
| 6,275,244 B1 | 8/2001 | Omelchenko et al. |
| 6,282,396 B1 | 8/2001 | Iwata et al. |
| 6,292,208 B1 | 9/2001 | Lofhus et al. |
| 6,295,435 B1 | 9/2001 | Shinohara et al. |
| 6,300,968 B1 | 10/2001 | Kerxhalli et al. |
| 6,307,578 B1 | 10/2001 | Castelli |
| 6,317,146 B1 | 11/2001 | Namura et al. |
| 6,317,147 B1 | 11/2001 | Tanaka |
| 6,321,060 B1 | 11/2001 | Nakayasu et al. |
| 6,324,375 B1 | 11/2001 | Hada et al. |
| 6,408,156 B1 | 6/2002 | Miyazaki et al. |

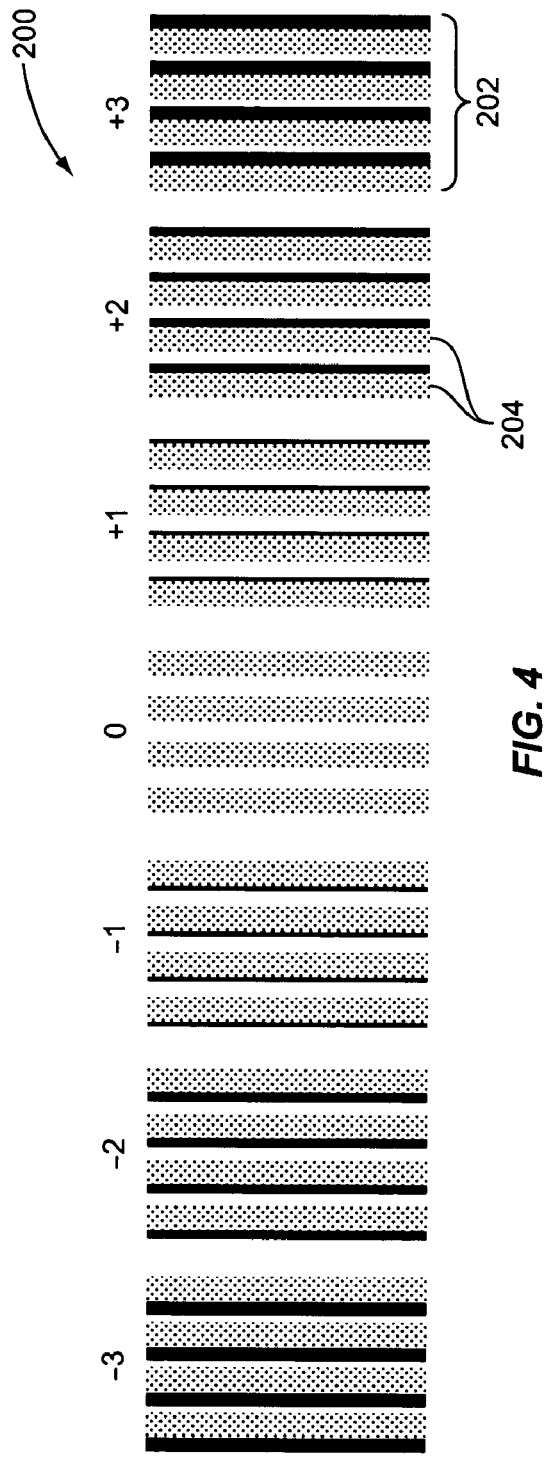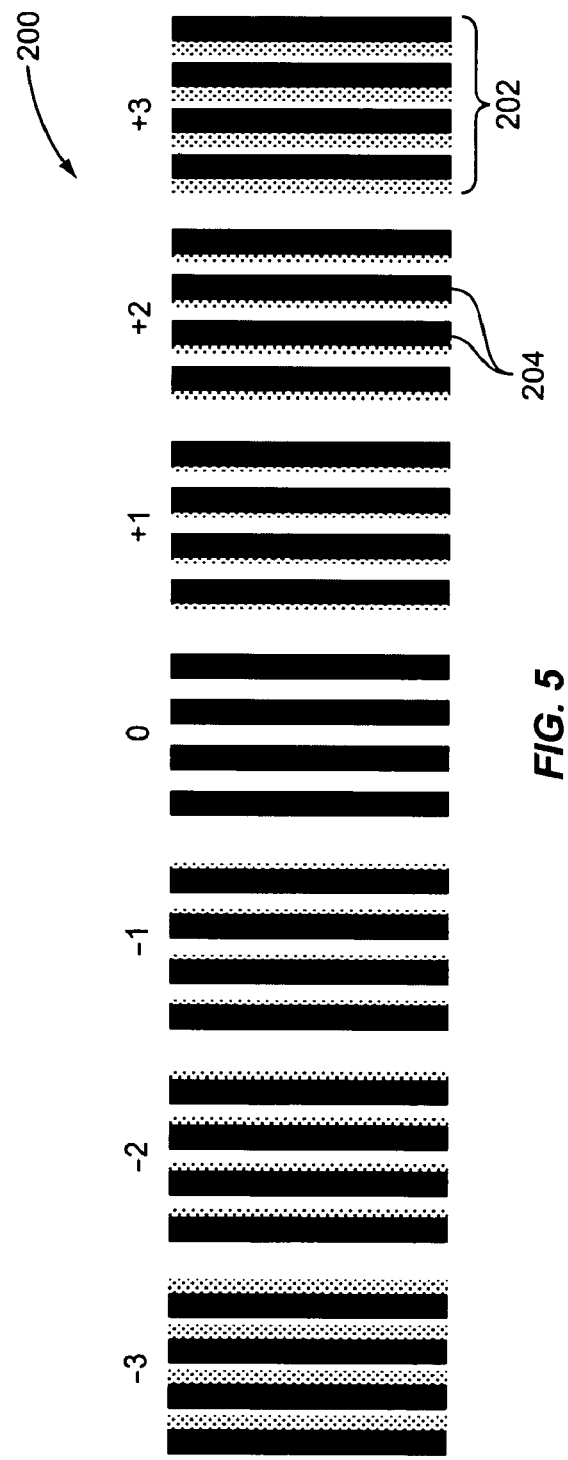

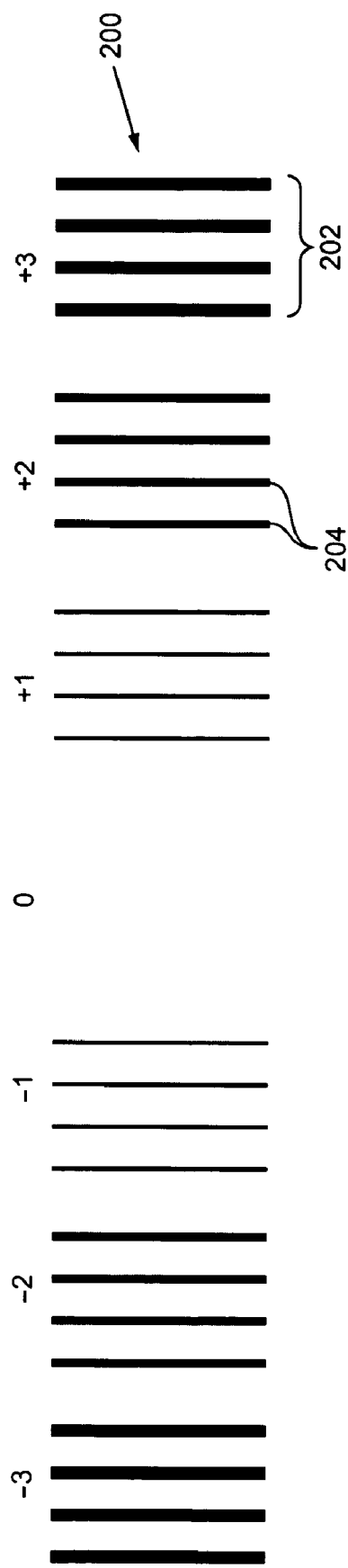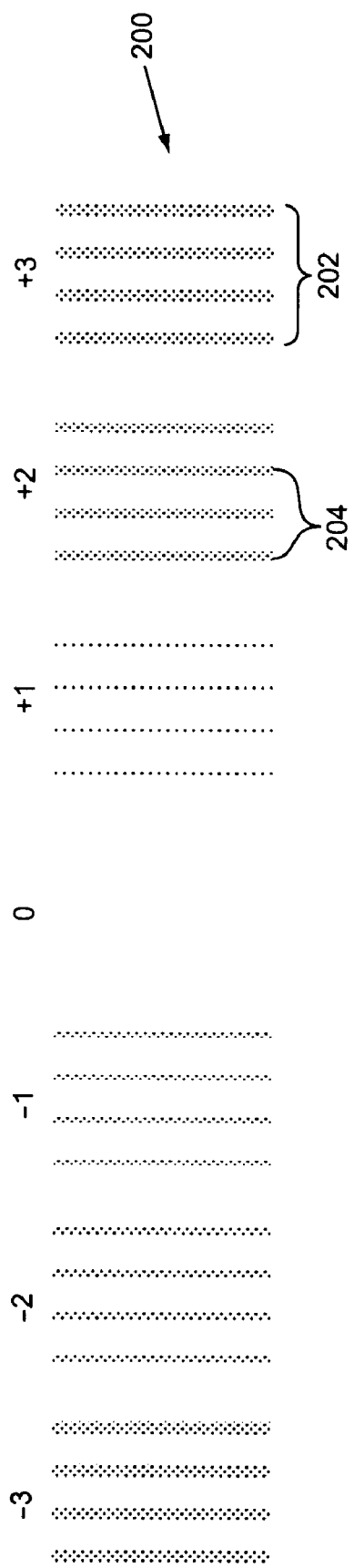
FIG. 10A
FIG. 10B

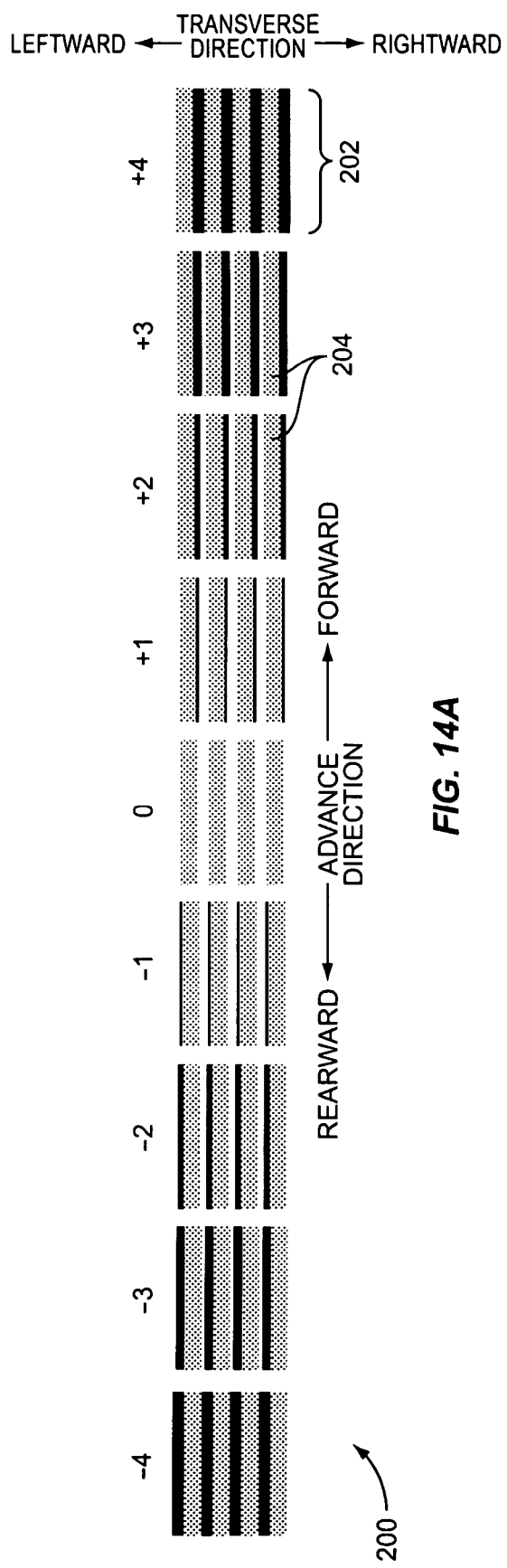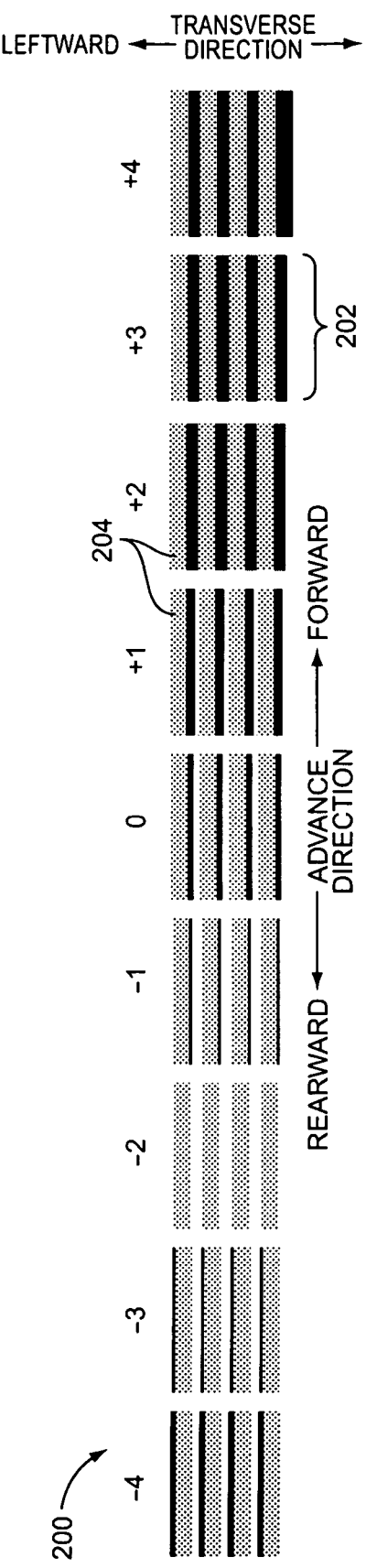
FIG. 14A
FIG. 14B

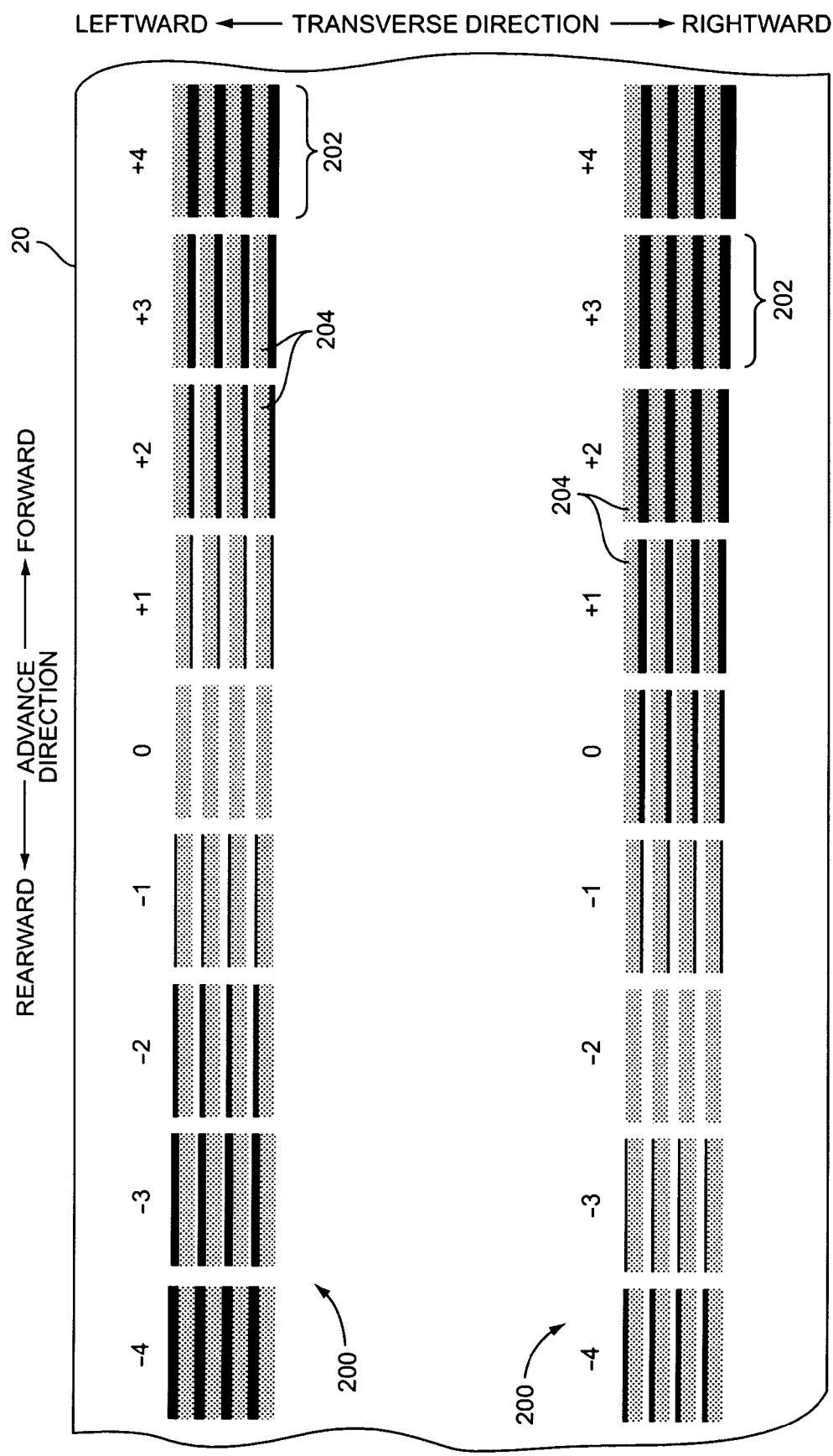

METHOD AND APPARATUS FOR DETECTING REGISTRATION ERRORS IN AN IMAGE FORMING DEVICE

BACKGROUND

A single pass electrophotographic printer typically employs four image forming stations, each one responsible for printing one of four primary colors, typically cyan, magenta, yellow, and black. The individual images, known as separations, produced by each of the four image forming stations are combined to produce the final output image. In tandem print engines, the four image forming stations are aligned in the paper transport direction such that each separation is formed in succession on the copy sheet as the copy sheet is transported through each print station. Typically, a belt transports the copy sheet. In some printers, a belt serves as an intermediate transfer member (ITM). The image forming stations transfer the individual image separations onto the ITM to form a composite image on the ITM. The composite image is then transferred from the ITM to the copy sheet at a transfer station.

The alignment of the image separations produced by each image forming station is critical to producing a quality printed image. Various factors affect the proper alignment of the image forming stations, such as tolerances, wear, and thermal expansion/contraction. It can be expensive and impractical to control tolerances and wear in order to provide acceptable color registration. Therefore, many printers include a mechanism to detect and correct for color registration errors.

One technique used to detect color registration errors is to print a set of overlapping registration marks in two or more different colors and examine the result. Registration errors are detected by misalignment of the registration marks. Some registration patterns, exemplified by U.S. Pat. No. 6,408,156, are designed to indicate the degree of misregistration. In the '156 patent, the registration pattern comprises a series of bars printed in two different colors, one of which is usually black and the other of which is usually yellow, magenta or cyan. The bars of one color have varying degrees of offset from corresponding bars of the other color. The degree of misregistration is indicated by the set of bars that align.

In most prior art printers, detection of registration errors is performed manually by the user. The registration pattern is printed on an output sheet and the user visually examines the registration pattern to determine the amount of any registration errors. After determining the amount of any registration errors, the user enters correction data into the printer via the operator panel. Correction of registration errors by manual inspection of registration marks and manual entry of correction data into the printer is inconvenient for users.

Various methods for automatic detection and correction of color registration errors are known. One such method is to print the registration pattern on a transport belt or intermediate transfer belt, illuminate the registration pattern, and detect the amount of reflected light with an optical sensor. Optical detection works best when a black registration mark is printed over the top of a color (e.g. magenta, cyan, or yellow) registration mark on a dark belt to produce a composite registration pattern. When progressively greater amounts of the color toner are revealed from underneath a layer of black toner, the amount of light reflected by the color toner increases and is easily detected. Optical detection does not work as well when a color registration mark is printed over the top of a black registration mark on a dark belt because the black toner is closer in reflectance to the belt. Thus, revealing progressively larger amounts of black toner from underneath a layer of color toner produces little net difference in reflectance. The opposite is true if the paper transport belt or ITM belt is light.

In single pass electrophotographic printers, the order of the image forming stations affects optical sensing of registration patterns. Placing the black image forming station last is compatible with optical sensing of registration patterns on a dark belt. In some cases, however, it may be desirable to place the black image forming station first, making optical sensing of the registration patterns problematic. This problem may be solved by using a specular sensor. In general, black toner has a diffuse reflectance characteristic compared to the surface of the ITM belt, which is mostly specular. Thus, a specular sensor can be used to sense the loss of specular signals as black toner covers the bare belt. The use of a specular sensor for color registration, however, is undesirable because it may require separate sensors for color registration and toner density correction.

SUMMARY

The present invention provides a method and apparatus for printing registration patterns using a technique referred to herein as the reverse transfer process, which is well suited for optical detection of registration patterns. The basic idea is to print a first registration mark on a paper transport belt or ITM belt at a first image forming station, and to partially erase or remove the first registration mark at a second image forming station by reverse transfer of toner to create the final registration pattern. Only one registration mark is printed on the belt. If a color registration mark is printed on a dark belt at the first image forming station, the reflectance of the color toner will be greater than the reflectance of the belt surface and thus the resulting registration pattern can be easily detected. Even if a black registration mark is printed on a dark belt, the resulting registration pattern can still be detected by increasing the gain of the sensor. The absence of color toner makes it possible to increase the gain of the sensor to detect varying amounts of black toner, even when printed on a dark belt.

Reverse transfer is accomplished at the second image forming station by imaging a second registration mark on the photoconductive member to produce a latent image as is normally done when printing overlapping registration marks. Toner at the second image forming station is prevented from developing the latent image at the second image forming station and the transfer device of the second image forming station is also set to a voltage that will repel properly charged toner. As the registration mark printed on the paper transfer belt or ITM belt reaches the second image forming station, the toner on the paper transport belt or ITM belt is transferred to the photoconductive member of the second image forming station where the undeveloped latent image of the second registration pattern overlaps the first registration pattern.

BRIEF DESCRIPTION OF THE DRAWINGS

FIG. 4 illustrates a composite registration pattern when there is no registration error with a color registration mark printed on top of a black registration mark.

FIG. 5 illustrates a composite registration pattern when there is no registration error with a black registration mark printed on top of a color registration mark.

FIGS. 10A and 10B illustrate exemplary single color registration patterns produced by a reverse transfer process according to the present invention.

FIGS. 14A and 14B illustrate exemplary registration patterns for detecting registration errors in the scan direction.

FIG. 16 illustrates two parallel registration patterns used in a manner to detect line length errors.

DETAILED DESCRIPTION

Figure 1:
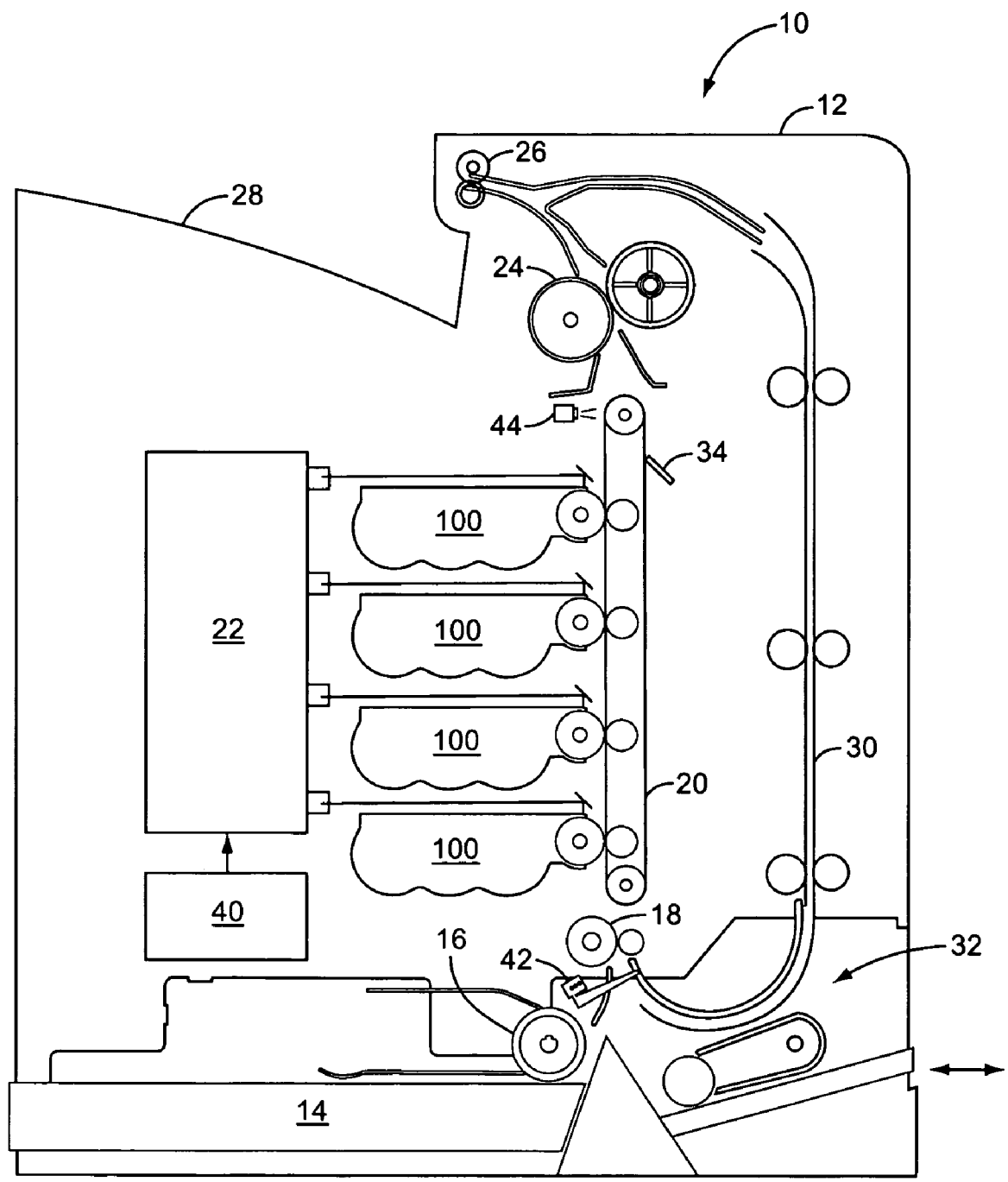
FIG. 1 schematically illustrates an electrophotographic printer.

FIG. 1 depicts a representative image forming apparatus, such as a printer, indicated generally by the numeral 10. The image forming apparatus 10 comprises a main body 12, at least one media tray 14, a pick mechanism 16, a registration roller 18, a media transport belt 20, a printhead 22, a plurality of image forming stations 100, a fuser roller 24, exit rollers 26, an output tray 28, and a duplex path 30. The media tray 14, disposed in a lower portion of the main body 12, contains a stack of print media on which images are to be formed. The media tray 14 is preferably removable for refilling. Pick mechanism 16 picks up media sheets from the top of the media stack in the media tray 14 and feeds the print media into a primary media path. Registration roller 18, disposed along a media path, aligns the print media and precisely controls its further movement along the media path. Media transport belt 20 transports the print media along the media path past a series of image forming stations 100, which apply toner images to the print media. Color printers typically include four image forming stations 100 for printing with cyan, magenta, yellow, and black toner to produce a four-color image on the media sheet. The media transport belt 20 conveys the print media with the color image thereon to the fuser roller 24, which fixes the color image on the print media. Exit rollers 26 either eject the print media to the output tray 28, or direct it into a duplex path 30 for printing on a second side of the print media. In the latter case, the exit rollers 26 partially eject the print media and then reverse direction to invert the print media and direct it into the duplex path. A series of rollers in the duplex path 30 return the inverted print media to the primary media path for printing on the second side. The image forming apparatus 10 may further include an auxiliary feed 32 to manually feed media sheets.

Figure 2:
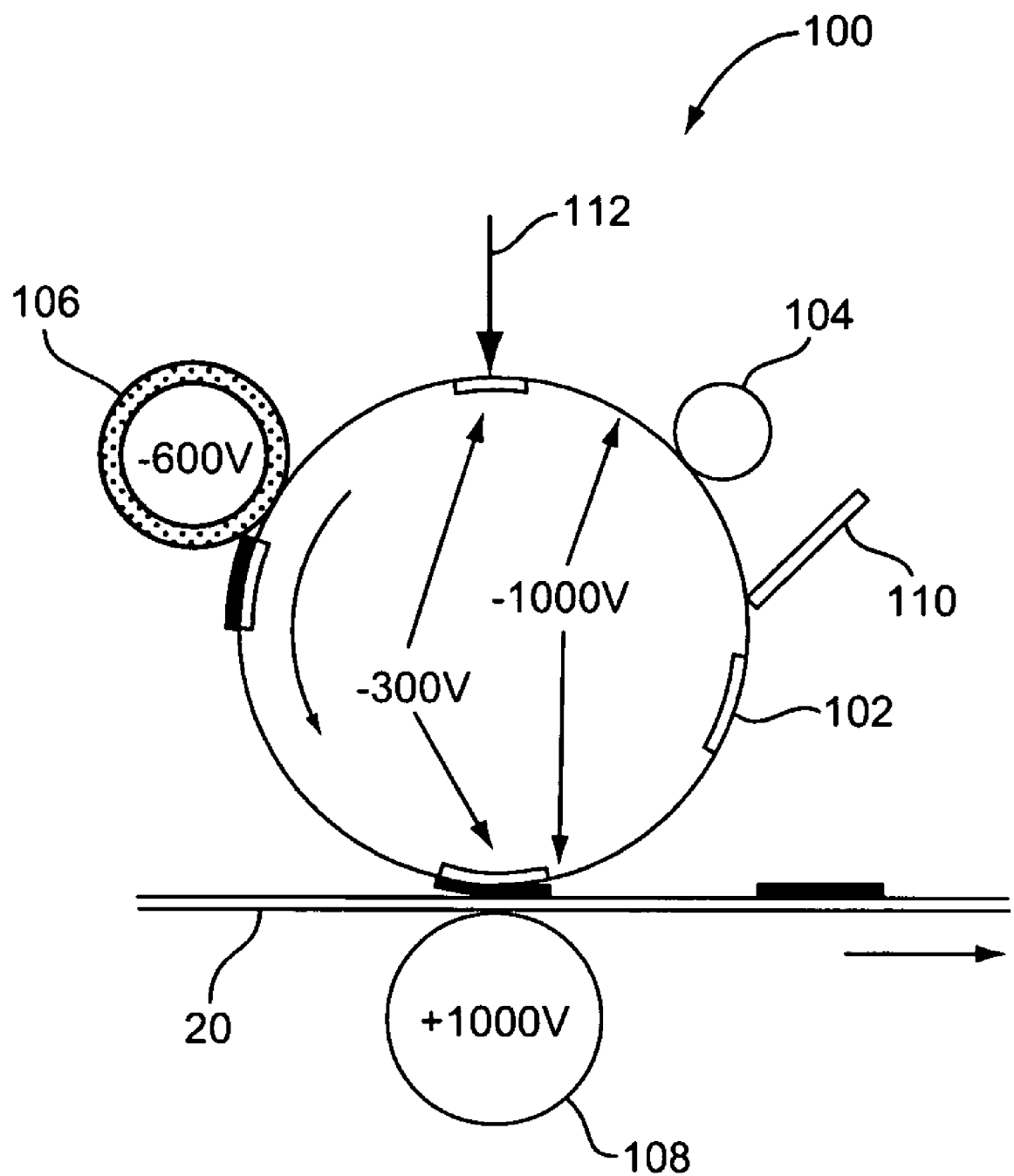
FIG. 2 schematically illustrates an image forming station in an electrophotographic printer.

FIG. 2 is a schematic diagram illustrating an exemplary image forming station 100. Each image forming station 100 includes a photoconductive (PC) drum 102, a charging unit 104, a developer roll 106, a transfer device 108, and a cleaning blade 110. The charging unit 104 charges the surface of the PC drum 102 to approximately −1000 v. A laser beam 112 discharges areas on the PC drum 102 to form a latent image on the surface of the PC drum 102. The areas of the PC drum 102 illuminated by the laser beam 112 are discharged to approximately −300 v. The PC drum core is held at −200 v. The developer roll 106 transfers negatively-charged toner having a core voltage of approximately −600 v to the surface of the PC drum 102 to develop the latent image on the PC drum 102. The toner is attracted to the most positive surface, i.e., the area discharged by the laser beam 112. As the PC drum 102 rotates, a positive voltage field produced by the transfer device 108 attracts and transfers the toner on the PC drum 102 to the media sheet. Alternatively, the toner images could be transferred to an intermediate transfer member (ITM) and subsequently from the ITM to the media sheet. Any remaining toner on the PC drum 102 is then removed by the cleaning blade 110. The transfer device may include a roll, a transfer corona, transfer belt, or multiple transfer devices, such as multiple transfer rolls.

A controller 40 controls the operation of the image forming apparatus 10. The functions of the controller 40 include timing control and control of image formation. To perform these functions, the controller 40 receives input from a paper detection sensor 42 and a registration sensor 44. The controller 40 controls the timing of the registration roller 18 and media transport belt 20 based on signals from the paper detection sensor 42 to feed the media sheets with proper timing to the image forming stations 100. As will be described in greater detail below, the controller 40 uses feedback from the registration sensor 44 to control latent image formation on the PC drums 102 to correct for registration errors.

To detect registration errors, the controller 40 causes the image forming apparatus 10 to print a registration pattern on a substrate. In one exemplary embodiment, the registration pattern is printed on the media transport belt 20. The printer could, alternatively, print the registration pattern on an ITM belt, or on the print media. The registration sensor 44 measures the amount of light reflected by the registration pattern and generates an output signal that is fed back to the controller 40. The controller 40 takes appropriate corrective action based on the output signal from the registration sensor 44. Various other types of registration sensors 44 may be used for sensing the remaining toner amount. Examples include transmissive optical sensing, capacitive sensing, non-contacting voltage sensing, and others.

Figure 3:
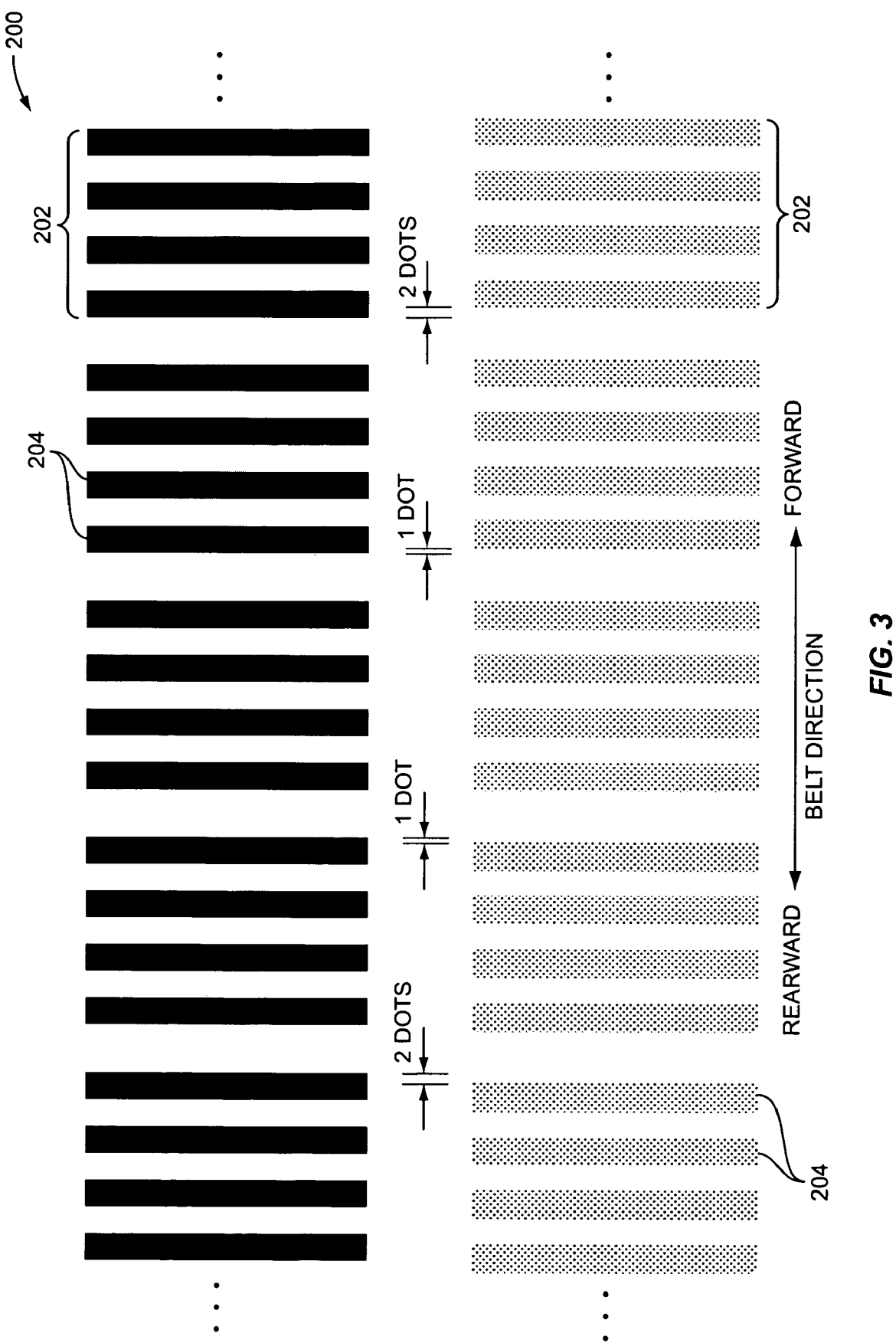
FIG. 3 illustrates exemplary registration marks in two colors used to print registration patterns.

FIG. 3 illustrates an exemplary two-color registration pattern 200 that may be used to detect and measure registration errors in the process direction. The registration pattern 200 comprises two registration marks shown separately but normally printed one on top of the other. For purposes of explanation, it is assumed that one registration mark is printed with black toner and that the other registration mark is printed with a non-black toner. To make discussion easier, the term color registration mark will refer to a non-black registration mark. In this context, the term "color" refers to the colors other than black. In other contexts, the term "color" may include black. It should be apparent to those skilled in the art which meaning is intended from the context.

Both the black registration mark and the color registration mark comprise a series of blocks 202, each block 202 having a plurality of parallel bars 204 of predetermined width and spaced apart a predetermined amount. For example, the bars 204 in a given block 202 may be five dots in width and spaced five dots apart. The blocks 202 in the black registration mark are uniformly spaced. The blocks 202 of the color registration mark are identical to the blocks 202 of the black registration mark except that the blocks 202 of the color registration mark are offset from corresponding blocks 202 of the black registration mark by varying amounts.

FIGS. 4 and 5 illustrate the composite registration pattern 200 when there is no registration error. In FIG. 4, the color registration mark is printed over the black registration mark to form the composite registration pattern 202. In FIG. 5, the black registration mark is printed over the color registration mark to form the composite registration pattern 200. As shown in FIGS. 4 and 5, the center block (labeled "0") of the color registration mark aligns perfectly with the center block of the black registration mark. However, the blocks in the color registration mark to the right of the center block as seen in FIGS. 4 and 5 are offset in the forward direction from corresponding blocks in the black registration mark. The amount of the offset progressively increases depending on the distance from the center block. Similarly, the blocks in the color registration mark to the left of the center block are offset in the rearward direction from corresponding blocks of the black registration mark. Again, the amount of the offset progressively increases as the distance from the center block increases. The blocks 202 are labeled to indicate the amount of the offset in dots, e.g., a +1 indicates a 1 dot forward shift and a −1 indicates a 1 dot rearward shift.

Figure 6:
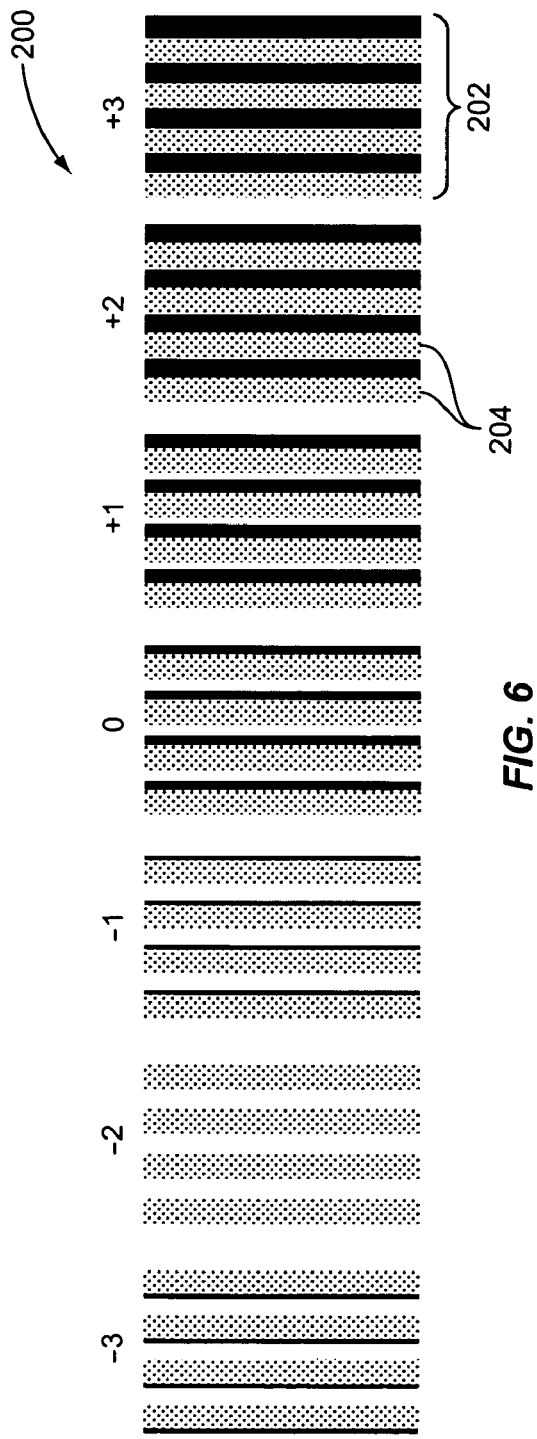
FIG. 6 illustrates a composite registration pattern when there is a registration error with a color registration mark printed on top of a black registration mark.
Figure 7:
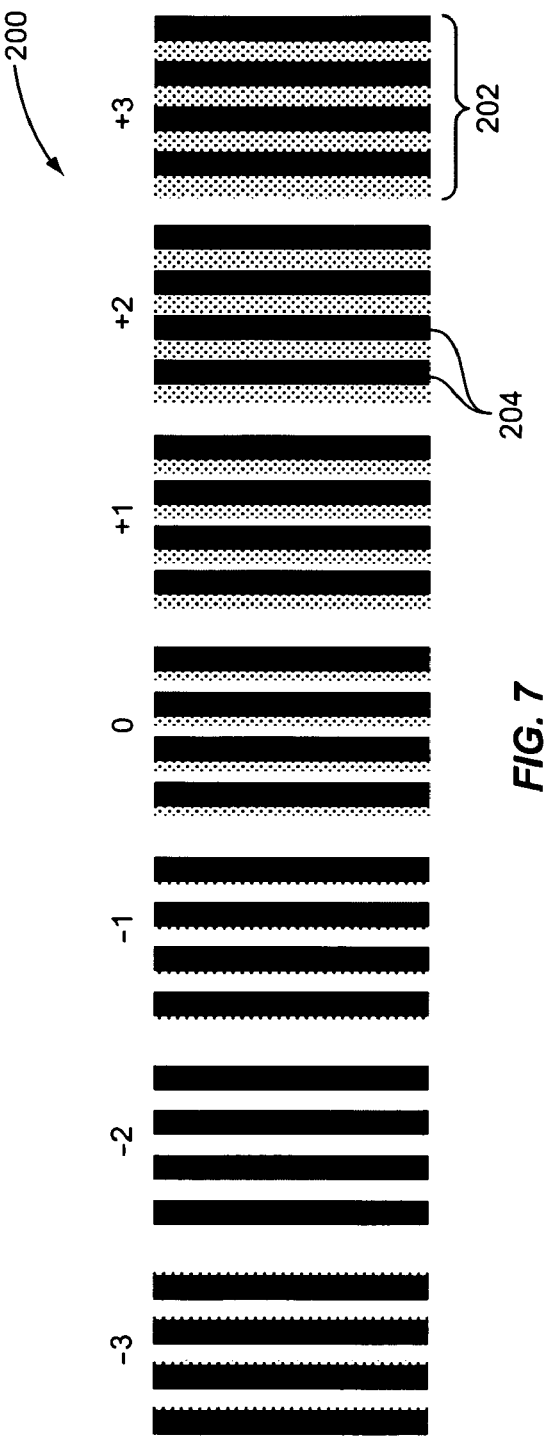
FIG. 7 illustrates a composite registration pattern when there is a registration error with a black registration mark printed on top of a color registration mark.

FIGS. 6 and 7 illustrate the composite pattern 200 when there is a registration error between color planes. FIG. 6 illustrates a color-on-black registration mark. FIG. 7 illustrates a black-on-color registration mark. FIGS. 6 and 7 show that the color registration mark is shifted two dots in the rearward direction, which may be detected by visual inspection of the composite registration pattern. In this example, it can be seen that the block 202 of the color registration mark labeled −2 aligns with the corresponding block of the black registration mark. Thus, by printing the composite registration pattern 200 on a belt, it is possible to detect and measure registration errors.

The example pattern shown in FIGS. 3-5 allows detection of registration errors between two color planes. In practice, three such registration patterns 200 are needed to detect registration errors between four color planes in a typical color printer. One color plane (typically black) is selected as a reference for the remaining three color planes (typically cyan, magenta, and yellow). A registration pattern is printed to detect the registration error, if any, of each color plane to the reference color plane. The present invention is not limited to using the black color plane as the reference plane. Those skilled in the art will recognize that the present invention may be used to detect registration errors between two non-black color planes.

Figure 8:
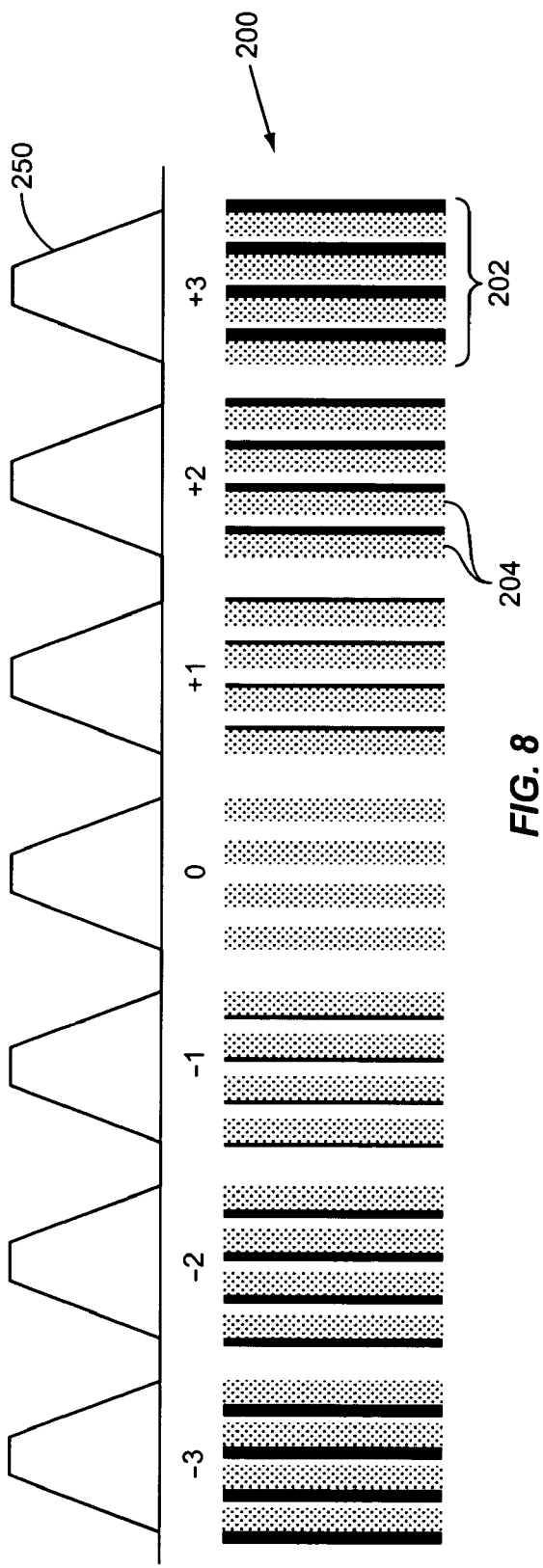
FIG. 8 illustrates an exemplary output signal generated by a registration sensor when a color-on-top composite registration pattern is printed on a dark surface.
Figure 9:
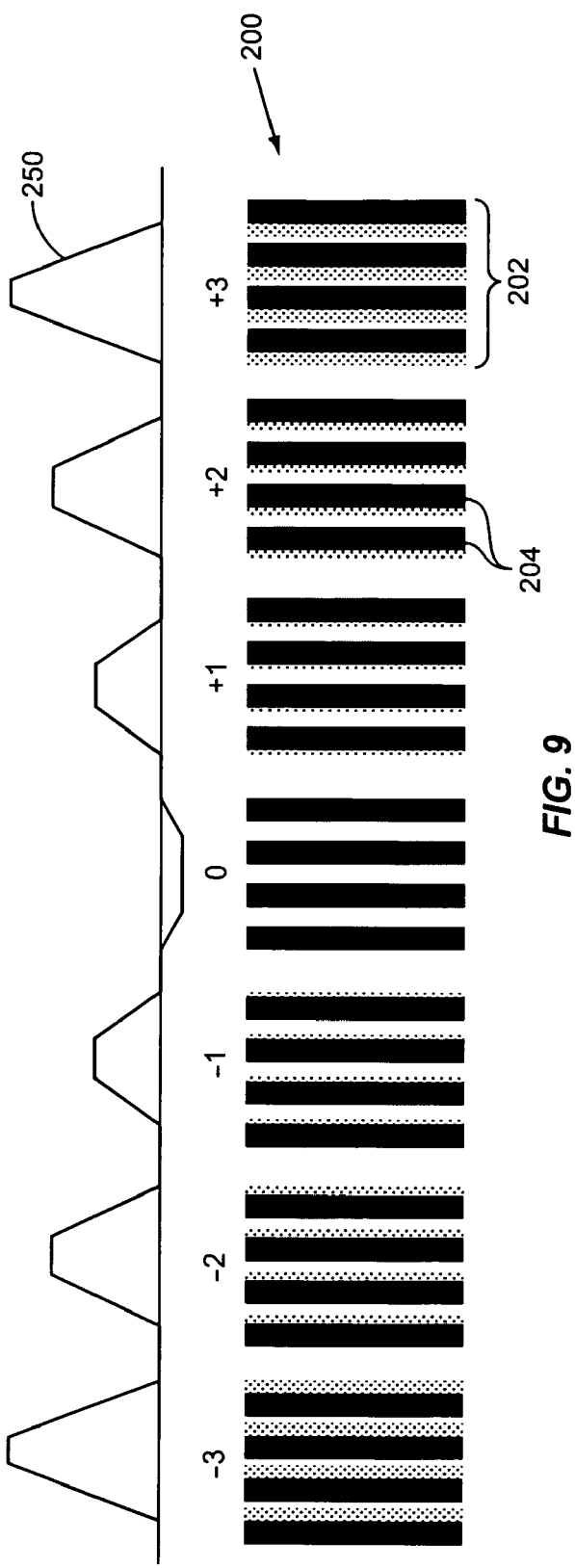
FIG. 9 illustrates an exemplary output signal generated by a registration sensor when a black-on-top composite registration pattern is printed on a dark surface.

FIGS. 8 and 9 illustrate one technique for the automatic detection of color registration errors. As shown in FIGS. 8 and 9, overlapping registration marks in two colors are printed on an ITM belt or media transport belt 20 with either color-on-top (FIG. 8) or black-on-top (FIG. 9). A registration sensor 44 measures light reflected from the composite registration pattern 200 and generates an output signal 250. FIGS. 8 and 9 illustrate the output signal 250 from the registration sensor 44 for both color-on-top and black-on-top registration patterns 200 printed on a dark belt, which may be either a media transport belt 20 or ITM belt (not shown). Due to the fact that the belt is similar in reflectance to the black toner, revealing progressively more black toner from under a layer of color toner (e.g., cyan, magenta, or yellow) produces little net difference in reflectance because the color toner produces a much stronger signal than the black toner. Printing the black registration mark over the color registration mark produces a better output signal from the registration sensor 44. The black toner blocks out the color toner where the black toner overlaps the color toner. In this case, it is easier to detect the degree of registration error based on the output of the registration sensor 44. Thus, when a dark belt is used, it is preferable to print the color registration mark first and the black registration mark over the color registration mark. The opposite is true if the belt is light.

In some instances, the order of the image forming stations 100 may require that the black registration mark be printed first. When using conventional detection techniques, such circumstances normally suggest the use of a light media transport belt 20 or ITM belt, which limits the choice of materials. Alternatively, additional and/or more expensive sensors could be used to detect the light reflected by the registration pattern 200. The present invention was developed to provide a method of detecting registration patterns 200 even when color is printed on top of black, though the present invention is not limited to such use.

The present invention uses a technique referred to herein as the reverse transfer process to print registration patterns 200. The basic idea underlying the reverse transfer process is to print a registration mark in a first color normally at a first image forming station 100, and to partially erase or remove the registration mark printed by the first image forming station 100 at a second image forming station 100 by reverse transfer of toner. The registration mark may be printed, for example, on the media transport belt 20, on an ITM belt (not shown), on a media sheet, or some other substrate. The second image forming station 100 does not print a registration mark, but instead partially erases the registration mark printed by the first image forming station 100 to form the final registration pattern 200. A latent image of a second registration mark is formed on the PC drum 102 at the second image forming station 100, but is not developed. The controller 40 controls the charge of the PC drum 102 and transfer device 108 so that the PC drum 102 attracts toner from the media transport belt 20 or ITM belt in areas where the latent image of the second registration mark overlap the first registration mark.

FIGS. 10A and 10B illustrate exemplary registration patterns produced by the reverse transfer process. FIG. 10A illustrates the situation where a black registration mark is printed first and then partially erased at a color image forming station 100. FIG. 10B illustrates the situation where a color registration mark is printed first and then partially erased at a black image forming station 100. As seen in FIGS. 10A and 10B, the center block 202 of the registration mark is completely or nearly completely erased when there is not registration error. The remaining blocks 202 of the registration mark show varying degrees of erasure depending on the distance from the center block.

Figure 11:
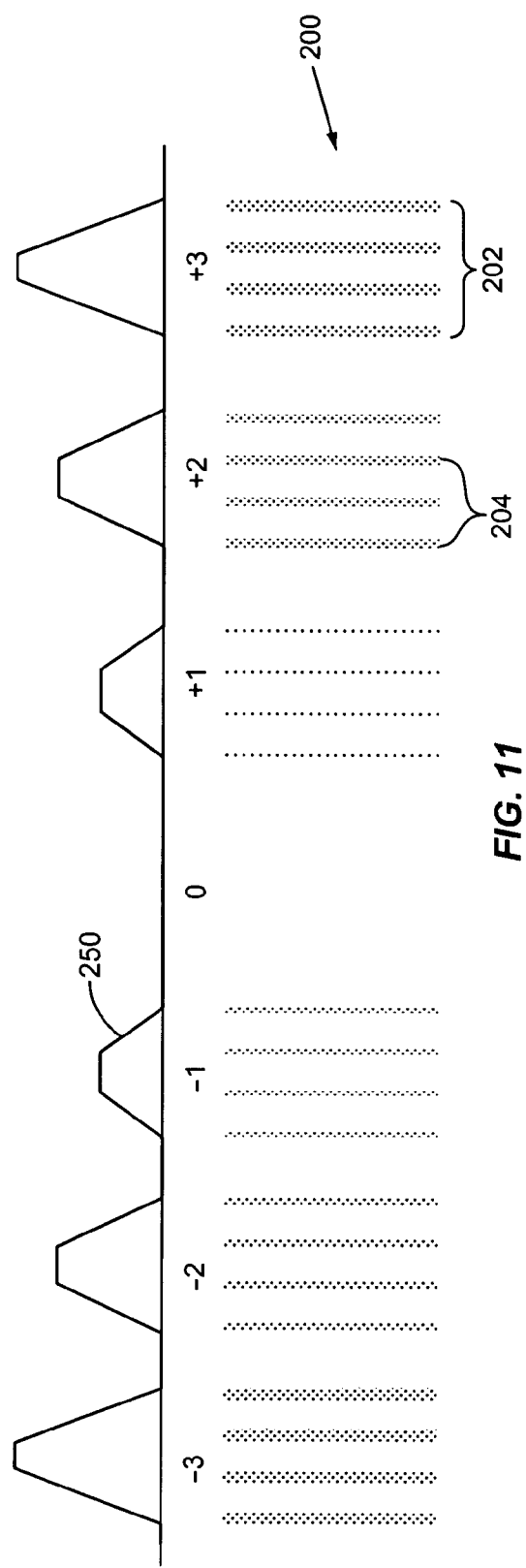
FIG. 11 illustrates an exemplary output signal generated by a registration sensor when a color registration mark is printed on a dark surface and partially erased at a color image forming station.
Figure 12:
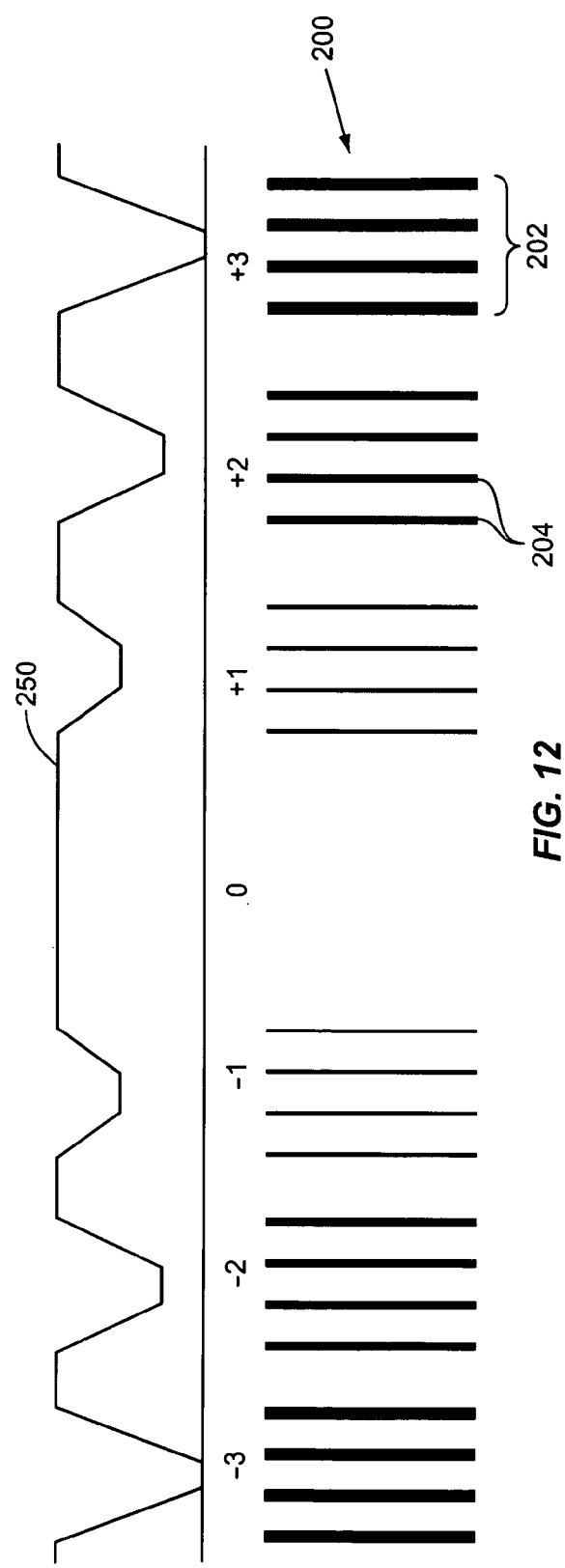
FIG. 12 illustrates an exemplary output signal generated by a registration sensor when a black registration mark is printed on a dark surface and partially erased at a color image forming station.

FIGS. 11 and 12 illustrate exemplary output signals 250 produced by the registration sensor 44 when the registration patterns 200 are printed on a dark belt. FIG. 11 represents the scenario where a color registration mark is printed by a color image forming station 100 on a dark media transport belt 20 or ITM belt and toner is removed by a black image forming station 100 in areas of overlap. FIG. 12 illustrates the scenario where a black registration mark is printed by a black image forming station 100 on a dark media transport belt 20 or ITM belt and toner is removed in areas of overlap at a color image forming station 100. In FIG. 11, the magnitude of the output signal increases in areas where more toner is present, and decreases in areas where less toner is present. When a black registration mark is printed on the media transport belt 20 as shown in FIG. 12, it is possible to increase the gain of the registration sensor 44 using conventional gain control techniques to distinguish small differences in reflectivity. Thus, differences in the amount of black toner on the media transport belt 20 can still be detected. Note that in the example illustrated in FIG. 12, the black toner is less reflective than the belt so that the signal decreases when more toner is present.

As shown above, the reverse transfer process allows the sensing of subtle differences in black toner on the media transport belt 20. This result is possible because the highly-reflective color toner is not present on the media transport belt 20. Therefore, registration sensing is made easier in printers where the black image forming station 100 precedes the color image forming station 100.

Although the registration patterns shown in FIGS. 10A and 10B derive from registration marks with multiple blocks, the registration pattern 200 according to the present invention may comprise a single block 202, or even a single bar 204. For example, the registration pattern 200 when no registration error is present may comprise a single block 202 composed of multiple bars 204 of a predetermined width. When registration error is present, the bars 204 of the registration pattern will have varying widths depending on the amount of the registration error resulting in differing amounts of light being reflected. The same idea can be applied to a mark composed of a single bar 204. The bar 204 printed on the substrate would have varying widths depending on the degree of registration error.

Figure 13:
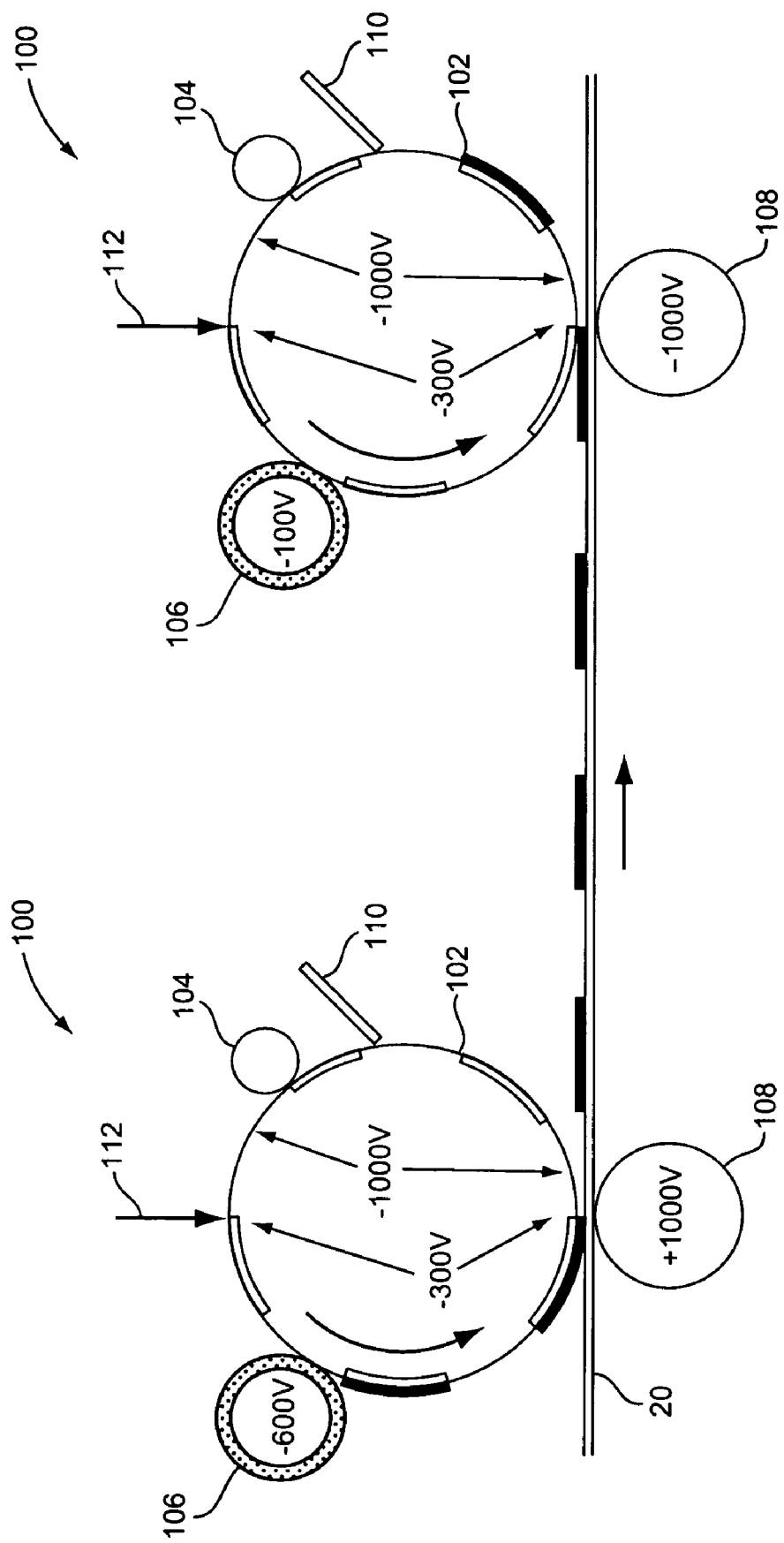
FIGS. 13 and 13A illustrate exemplary methods of implementing the reverse transfer process.

Referring to FIG. 13, one exemplary method of printing registration patterns 200 using the reverse transfer process is illustrated. The first image forming station 100 prints a first registration mark, which may be black, on the media transport belt 20 or ITM belt. The latent image of a second registration mark is formed on the PC drum 102 of the second image forming station 100 in a normal manner as if it were printing an overlapping registration mark. A laser reduces the charge on the surface of the PC drum 102 from approximately −1000 v to approximately −300 v in the discharged area to form the latent image. Toner at the second image forming station 100 is prevented from developing the latent image on the PC drum 102, regardless of PC charge or discharge level, by setting the developer bias voltage to a value low enough to prevent development of the latent image on the PC drum 102. For example, the developer bias voltage may be set to approximately −100 v. The transfer device 108 of the second image forming station 100 is also set to a voltage level that will repel properly-charged toner (typically −500 v to −1200 v). As the registration mark printed by the first image forming station 100 reaches the second image forming station 100, the toner applied to the media transport belt 20 by the first image forming stations 100 is repelled to the surface with the more positive potential, i.e., the discharged area of the PC drum 102 of the second image forming station 100. If the transfer voltage at the second image forming station 100 is negative (instead of positive), and has an absolute value greater than the absolute value of the discharged area of the PC drum 102, the toner transferred to the media transport belt 20 or ITM belt by the first image forming station 100 will be transferred to the surface of the PC drum 102 at the second image forming station 100 where the undeveloped latent image on the PC drum 102 overlaps the registration mark produced by the first image forming station 100. The toner is then cleaned from the second photoconductive drum 102 in a normal manner. Toner applied to the media transport belt 20 is removed by a cleaning blade 34 (FIG. 1). Using this approach, if the registration marks from the first and second stations 100 overlap perfectly, there will be minimal or no toner remaining on the media transport belt 20 after the second image forming station 100. In effect, the second image forming station 100 removes toner from the media transport belt 20 or ITM belt where there is image overlap. Toner is left on the media transport belt 20 or ITM belt where the images do not overlap to create the registration pattern shown in FIGS. 10A and 10B.

Figure 13A:
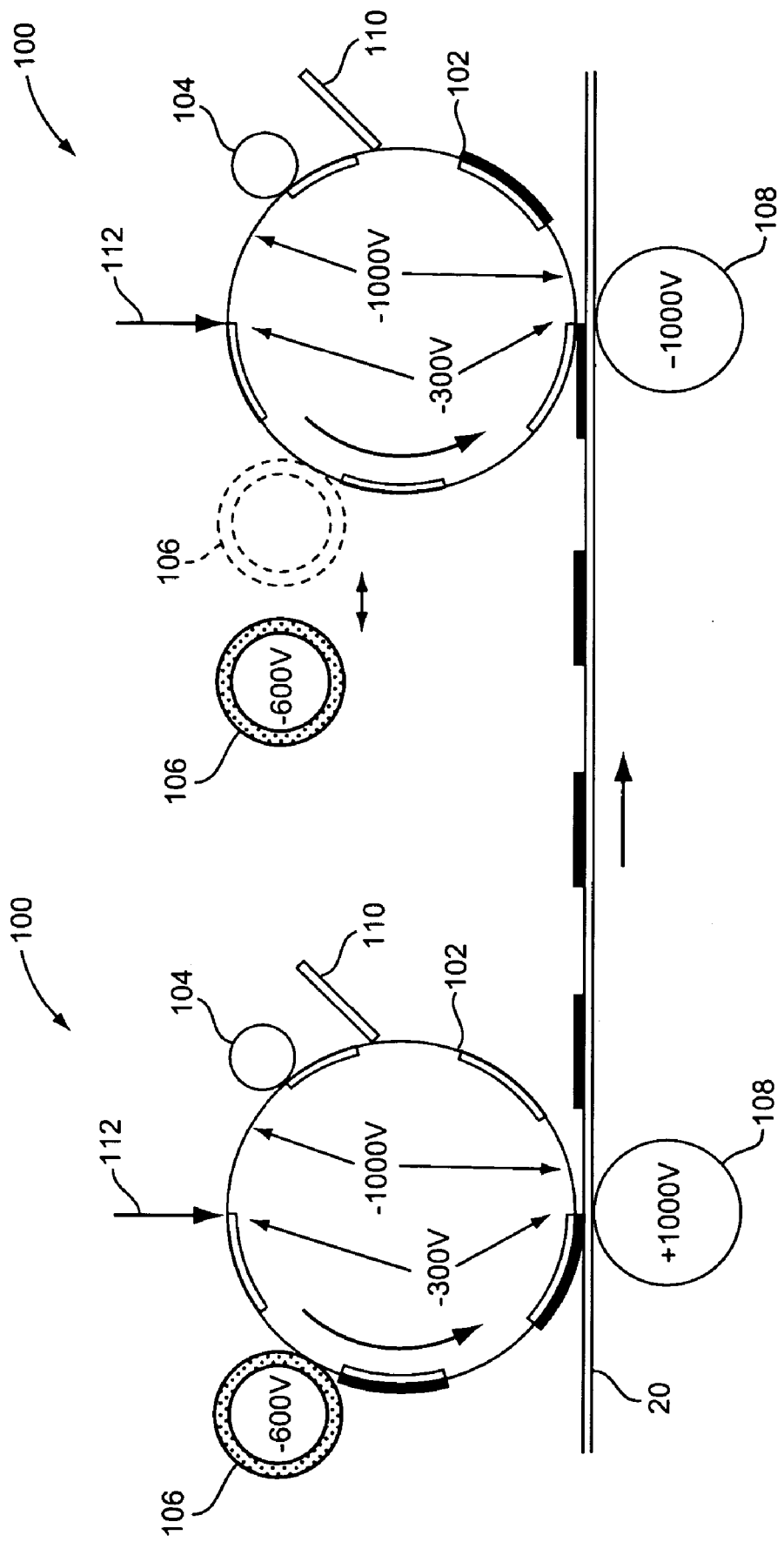

FIG. 13A discloses another manner of preventing the second image forming station 100 from developing the latent image on the PC drum 102. In this embodiment, the developer roll 106 is moved away from the PC drum 102 to prevent development of the latent image. The developer bias voltage does not matter when the developer roll 106 is moved from the PC drum 102 and therefore may remain the same or be different than the first image forming station. Once the normal image formation process is resumed, the developer roll 106 is moved back to the PC drum 102.

In general, the reverse transfer of toner is maximized when the charge on the PC drum 102 is as high as possible and the voltage of the discharged area is as low as possible. The high PC drum charge prevents reverse transfer to areas not discharged by the laser. The low discharge voltage is desirable to create the least negatively charged surface that acts in conjunction with the negative transfer voltage to best attract the negatively-charged toner. Therefore, high charge voltages and high laser energies are desirable. In some specific implementations, it may be necessary to perform an automated search for the best combination of charged voltage, developer voltage, laser power, and transfer voltage to optimize the reverse transfer of toner.

Figure 15:
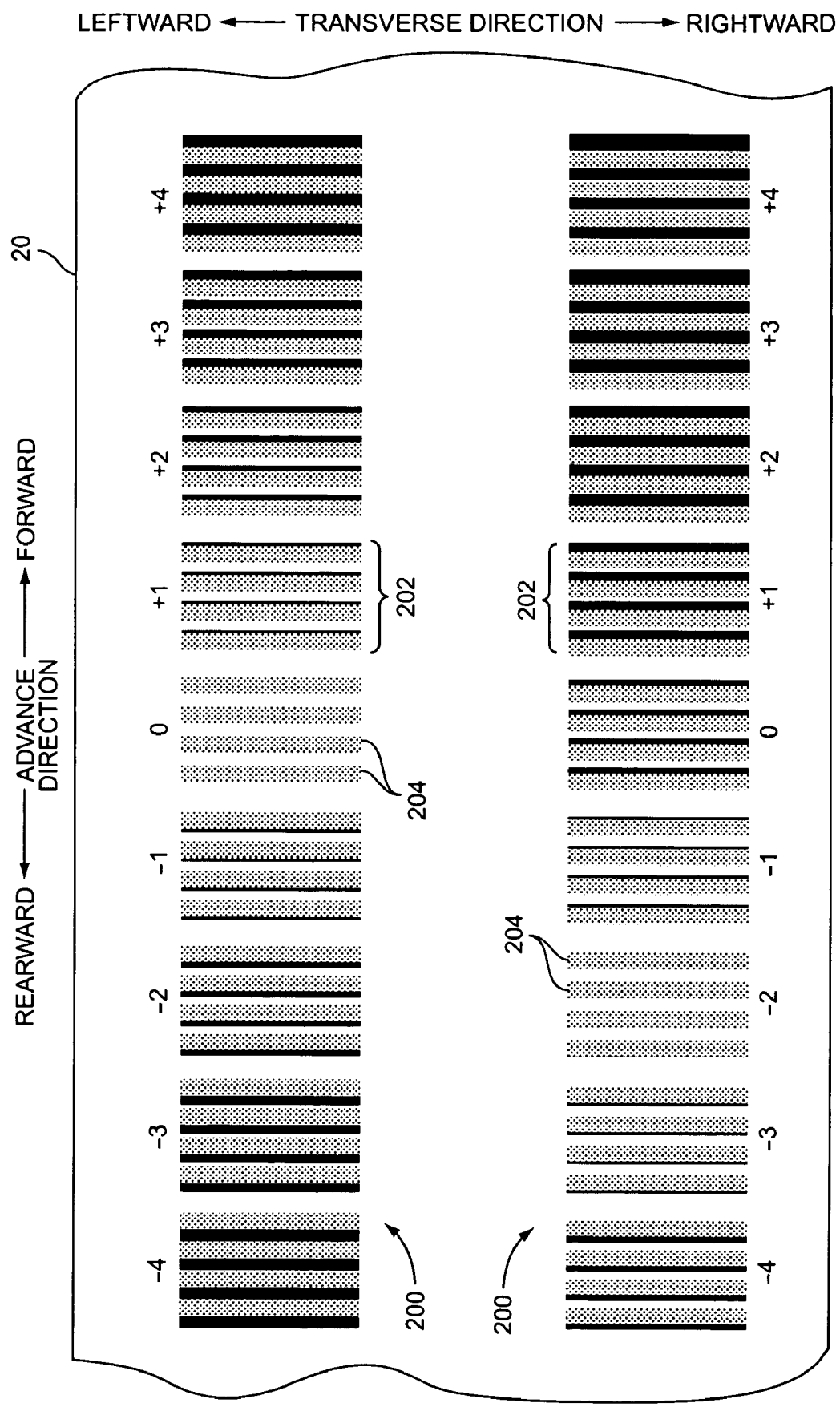
FIG. 15 illustrates two parallel registration patterns used in a manner to detect skew.

The examples used in this description illustrate registration patterns intended to correct for color registration errors in the process direction. The same techniques can be applied to detect color registration errors in the scan direction. FIGS. 14A and 14B illustrate exemplary registration patterns for detecting misalignment in the scan direction. Skew and line length errors can also be detected by printing parallel registration patterns, preferably along opposing edges of the media transport belt 20 as shown in FIG. 15 and FIG. 16. FIG. 15 illustrates the registration patterns for skew detection. FIG. 16 illustrates the registration patterns for line length detection.

After detecting registration errors, the controller 40 may take appropriate measures to correct for such errors. Any known techniques for control of color registration may be used with the registration error detection according to the present invention. For example, the controller 40 may correct registration errors in the process direction by altering the top margin setting of the color plane(s), relative to black. The margin may be varied an integer number of pels by inserting or omitting start-of-scan (or Hsync) signals, and may be varied at ½ pel or other increments via scan synthesis. Gross registration errors may be corrected by adjusting the top margin by an integral number of H-syncs.

Sub-pel accuracy may be achieved by scan synthesis, in which the output intensity of the laser beam is modulated between two successive scan lines, resulting in an effective sub-pel shift of the image plane. For errors in the scan direction, the controller 40 may adjust the detect-to-print timing from the start of scan (or Hsync) signal to start of imaging in an amount commensurate with the sensed scan direction error. Correction for skew may be accomplished by correcting the difference between scan lines on the right and left sides of the image in the process direction via image pre-processing in a raster image processor. Line length errors may be corrected via pel slice insertion and removal where non-printing "slices" are inserted into and removed to extend or shorten line length. The number of slices inserted or removed is commensurate with the amount of the line length error. Numerous other techniques could also be used to correct for registration errors. These techniques are well known in the art and are therefore not described herein in detail.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of detecting image registration errors in a printer, comprising:
   a) forming a first registration mark on a substrate at a first image forming station;
   b) partially erasing the first registration mark formed on the substrate at a second image forming station to form a registration pattern;
   c) sensing the registration pattern;
   d) detecting registration errors based on the sensed registration pattern.

2. The method of claim 1 wherein the step of partially erasing the registration mark formed on the substrate at the second image forming station comprises:
   a) forming a latent image of a second registration mark on an image carrier at the second image forming station; and
   b) adjusting an operating parameter of the second image forming station such that toner applied to the substrate by the first image forming station to form the first registration mark is transferred to the image carrier at the second image forming station.

3. The method of claim 2 wherein the step of adjusting the operating parameter of the second image forming station comprises adjusting a voltage of the image carrier at the second image forming station to be positive relative to a voltage of a transfer device at the second image station.

4. The method of claim 3 wherein the step of adjusting an operating parameter of the second image forming station further comprises adjusting a voltage of a developer roll at the second image forming station to prevent the latent image of the second registration mark from being developed.

5. The method of claim 3 wherein the step of adjusting an operating parameter of the second image forming station comprises moving a developer roll at the second image forming station away from the image carrier at the second image formation station.

6. The method of claim 2 wherein the first registration mark comprises a first series of parallel bars, and the second registration mark comprises a second series of parallel bars offset from corresponding bars in the first registration mark by varying amounts.

7. The method of claim 6 further comprising detecting the degree of registration errors based on the alignment of the bars in the first and second registration marks.

8. The method of claim 6 wherein the first and second series of parallel bars are divided into groups, and wherein the groups in the second registration mark have varying offsets relative to the corresponding groups in the first registration mark.

9. The method of claim 8 further comprising detecting the degree of registration errors based on the alignment of the groups.

10. The method of claim 6 wherein the first and second series of parallel bars are parallel to an image scanning direction to detect registration errors in a process direction.

11. The method of claim 6 wherein the first and second series of parallel bars are parallel to a process direction to detect registration errors in an image scanning direction.

12. The method of claim 1 further comprising printing first and second registration patterns along opposing sides of the substrate to enable detection of skew and line length errors.

13. The method of claim 2 wherein the latent image of the second registration mark erases the first registration mark on the substrate in areas where the latent image of the second registration mark overlaps the first registration mark.

14. The method of claim 1 wherein the substrate is a media transport member.

15. The method of claim 1 wherein the substrate is an intermediate image transfer member.

16. The method of claim 1 wherein the substrate is a sheet of print media.

17. The method of claim 1, wherein the step of sensing the registration pattern comprises sensing light reflected by the registration pattern.

18. The method of claim 17, wherein the step of detecting registration errors based on the registration pattern comprises detecting registration errors based on the sensed light reflected by the registration pattern.

19. A image forming device comprising:
   a first image forming station to print a first registration mark on a substrate;
   a second image forming station controlled so as to at least partially erase the first registration mark printed on the substrate by the first image forming station to form a registration pattern;
   a sensor to detect the registration pattern and to generate an output signal; and
   a processor to determine registration errors based on the output signal from the sensor.

20. The image forming device of claim 19 wherein the processor further adjusts an operating parameter of the image forming device to correct for the registration errors.

21. The image forming device of claim 19 wherein the second image forming station includes an image carrier for carrying a latent image of a second registration mark, wherein an operating parameter of the second image forming station is controlled so that toner applied to the substrate by the first image forming station to form the first registration mark is transferred to the image carrier of the second image forming station.

22. The image forming device of claim 21 wherein the voltage of the image carrier at the second image forming station is controlled to be positive relative to an image transfer device at the second image forming station.

23. The image forming device of claim 21 wherein the voltage of a developer roll at the second image forming station is controlled to prevent the latent image on the image carrier at the second image forming station from being developed.

24. The image forming device of claim 21 wherein a developer roll at the second image forming station is moved to prevent the latent image on the image carrier at the second image forming station from being developed.

25. The image forming device of claim 21 wherein the first registration mark comprises a first series of parallel bars, and the second registration mark comprise a second series of parallel bars offset from corresponding bars in the first registration mark by varying amounts.

26. The image forming device of claim 25 further comprising detecting the degree of registration errors based on the alignment of the bars in the first and second registration marks.

27. The image forming device of claim 25 wherein the first and second series of parallel bars are divided into groups, and wherein the groups in the second registration mark have varying offsets relative to the corresponding groups in the first registration mark.

28. The image forming device of claim 27 further comprising detecting the degree of registration errors based on the alignment of the groups.

29. The image forming device of claim 25 wherein the first and second series of parallel bars are parallel to an image scanning direction to detect registration errors in a process direction.

30. The image forming device of claim 25 wherein the first and second series of parallel bars are parallel to a process direction to detect registration errors in an image scanning direction.

31. The image forming device of claim 19 further comprising forming first and second registration patterns along opposing sides of the substrate to enable detection of skew and line length errors.

32. The image forming device of claim 20 wherein the latent image of the second registration mark erases the first registration mark on the substrate in areas where the latent image of the second registration mark overlaps the first registration mark.

33. The image forming device of claim 19 wherein the substrate is a media transport member.

34. The image forming device of claim 19 wherein the substrate is a intermediate image transfer member.

35. The image forming device of claim 19 wherein the substrate is a sheet of print media.

36. The image forming device of claim 19 wherein the sensor detects light reflected by the registration pattern.

37. A method of forming a registration pattern on a substrate to enable detection of registration errors, comprising:
  a) forming a first registration mark on a substrate at a first image forming station; and
  b) partially erasing the first registration mark formed on the substrate at a second image forming station to form a registration pattern.

38. The method of claim 37 wherein the step of partially erasing the registration mark formed on the substrate at a second image forming station comprises:
  a) forming a latent image of a second registration mark on an image carrier at the second image forming station;
  b) adjusting an operating parameter of the second image forming station such that toner applied to the substrate by the first image forming station to form the first registration mark is transferred to the image carrier at the second image forming station.

39. The method of claim 38 wherein the step of adjusting an operating parameter of the second image forming station comprises adjusting a voltage of the image carrier at the second image forming station to be positive relative to a voltage of a transfer device at the second image station.

40. The method of claim 39 wherein the step of adjusting an operating parameter of the second image forming station further comprises adjusting a voltage of a developer roll at the second image forming station to prevent the latent image of the second registration mark from being developed.

41. The method of claim 39 wherein the step of adjusting an operating parameter of the second image forming station further comprises moving a developer roll away from the image carrier at the second image forming station to prevent the latent image of the second registration mark from being developed.

42. The method of claim 38 wherein the first registration mark comprises a first series of parallel bars, and the second registration mark comprises a second series of parallel bars offset from corresponding bars in the first registration mark by varying amounts.

43. The method of claim 42 wherein the first and second series of parallel bars are divided into groups, and wherein the groups in the second registration mark have varying offsets relative to the corresponding groups in the first registration mark.

44. The method of claim 42 wherein the first and second series of parallel bars are parallel to an image scanning direction to detect registration errors in a process direction.

45. The method of claim 42 wherein the first and second series of parallel bars are parallel to a process direction to detect registration errors in an image scanning direction.

46. The method of claim 35 further comprising printing first and second registration patterns along opposing sides of the substrate enable detection of skew and line length errors.

47. A image forming device comprising:
  a first image forming station to print a first registration mark on a substrate, the first imaging forming station including a first photoreceptive drum to receive a latent image of the first registration mark, a first developer roll having a voltage to enable transfer of toner to the photoreceptive drum to produce a toner image of the first registration mark on the first photoreceptive drum; and a first transfer device having a voltage sufficient to transfer the toner image of the first registration mark to the substrate to print the first registration mark on the substrate;
  a second image forming station controlled so as to at least partially erase the first registration mark printed on the substrate by the first image forming station to form a registration pattern, the second image forming station including a second photoreceptive drum to receive a second latent image of a second registration mark, a second developer roll that prevents development of the second latent image on the second photoreceptive drum, and a second transfer device having a voltage to cause toner on the substrate to transfer to the second photoreceptive drum where the undeveloped second latent image overlaps the first registration mark on the substrate.

48. The image forming apparatus of claim 47 further comprising a sensor to detect light reflected by the registration pattern and to generate an output signal; and a processor to determine any registration errors based on the output signal from the sensor.

49. The image forming apparatus of claim 47 wherein the first and second latent images have a charge of approximately −300 V.

50. The image forming apparatus of claim 49 wherein the first developer roll has a potential of approximately −600 V and the second developer roll has a potential of approximately −100 V.

51. The image forming apparatus of claim 49 wherein the first transfer device has a potential of approximately +1000 V and the second transfer device has a potential of approximately −1000 V.

52. A method of detecting registration errors between two color separations in a printer, the method comprising:
   forming a single color registration pattern on a substrate that shows registration errors between two or more separations; and
   determining registration errors based on the single color registration pattern.

53. The method of claim 52 wherein the single color registration mark is printed in black.

54. The method of claim 52 wherein the single color registration mark is printed in a non-black color.

55. The method of claim 52 wherein determining registration errors based on the single color registration pattern comprises manually inspecting the registration pattern.

56. The method of claim 52 wherein determining registration errors based on the single color registration pattern comprises optically detecting the registration mark with an optical sensor and generating an output signal indicative of the registration error.

* * * * *